US011753581B2

(12) United States Patent
Lu et al.

(10) Patent No.: US 11,753,581 B2
(45) Date of Patent: Sep. 12, 2023

(54) DELAYED GELATION POLYMER SYSTEM

(71) Applicants: CNPC USA Corporation, Houston, TX (US); Beijing Huamei Inc., Beijing, TX (US)

(72) Inventors: Meng Lu, Sugar Land, TX (US); Fuchen Craig Liu, Panjin (CN)

(73) Assignees: CNPC USA Corporation, Houston, TX (US); Beijing Huamei, Inc., Beijing (CN); China National Petroleum Corporation, Beijing (CN)

(*) Notice: Subject to any disclaimer, the term of this patent is extended or adjusted under 35 U.S.C. 154(b) by 261 days.

(21) Appl. No.: 16/703,632

(22) Filed: Dec. 4, 2019

(65) Prior Publication Data
US 2021/0171820 A1 Jun. 10, 2021

(51) Int. Cl.
*C09K 8/58* (2006.01)
*C08F 22/00* (2006.01)
*C08F 220/58* (2006.01)
*E21B 43/16* (2006.01)
*C09K 8/588* (2006.01)
*C08F 220/56* (2006.01)

(52) U.S. Cl.
CPC ............ *C09K 8/588* (2013.01); *C08F 220/56* (2013.01); *C08F 220/58* (2013.01); *E21B 43/16* (2013.01); *C08F 220/585* (2020.02); *C08F 2810/20* (2013.01)

(58) Field of Classification Search
None
See application file for complete search history.

(56) References Cited

U.S. PATENT DOCUMENTS 9,464,504 B2  10/2016  Kakadjian et al.
9,796,902 B2  10/2017  Osorio et al.
2014/0144628 A1*  5/2014  Moradi-Araghi ...... C09K 8/588
                                                166/275

* cited by examiner

*Primary Examiner* — Charles R Nold
(74) *Attorney, Agent, or Firm* — HOGAN LOVELLS US LLP

(57) ABSTRACT

This disclosure describes the composition and methods of use for a novel delayed polymer gelation system. This polymer gelation system includes a polymer of acrylamide, AMPS and 100-2,000 ppm polyethylene glycol diacrylate in inverse emulsion form, and a polyethyleneimine (PEI) with Mw of 5,000-100,000 Dalton as the crosslinking agent.

18 Claims, 2 Drawing Sheets

DELAYED GELATION POLYMER SYSTEM

FIELD

The disclosure relates generally to a new delayed gelation polymer system for oil field applications. The disclosure relates specifically a polymer and a crosslinker to form stable gels with delayed gelation time.

BACKGROUND

Water injection is used in increasing oil production by increasing reservoir pressure and sweeping oil to the production well. However, the sweep efficiency is limited by the high permeability zones in the reservoir, where the water will prefer to go through and bypassing the less permeable oil-bearing zones. There are several methods that have been proposed to block the high permeability zones with polymer gels. However, there are two major problems with these polymer gelation systems. Firstly, the injected polymer solution usually has a much higher viscosity than water. This will reduce the selectivity of the flow of the polymer solution to the high permeability zone. Therefore, the oil-bearing low permeability zone is at risk of being partially blocked by the later-formed polymer gel and the oil recovery is reduced. The high viscosity will also slow down the transport of the polymer solution in the formation to block the high permeability zone deep in the reservoir. Secondly, the gelation of polymer system needs to be delayed in order to place the polymers in the high permeability zones deep in the formation. Previous methods required a delayed gelling agent in addition to the polymer and the crosslinking agent to achieve the delaying of the gelation.

SUMMARY

Disclosed herein is a delayed gelation polymer system that does not require a delayed gelling agent.

An embodiment of the disclosure is a polymer system consisting essentially of: a polymer comprising acrylamide; 2-acrylamido-2-methylpropane sulfonic acid (AMPS); polyethylene glycol diacrylate; and a crosslinker comprising polyethyleneimine; wherein the polymer is in inverse emulsion form. In an embodiment, the polymer system of claim 1 wherein the polymer is at a concentration of about 25-35% in the inverse emulsion. In an embodiment, the polymer comprises about 50-95% acrylamide; about 5-50% AMPS; about 100-2000 parts per million polyethylene glycol diacrylate; and wherein the crosslinker comprises about 500-2000 parts per million polyethyleneimine. In an embodiment, the polymer comprises about 80% acrylamide; about 20% AMPS; about 600 parts per million polyethylene glycol diacrylate. In an embodiment, the polyethyleneimine has a molecular weight of about 5,000-100,000 Daltons. In an embodiment, the polyethyleneimine has a molecular weight of about 60,000 Daltons. In an embodiment, the polymer system undergoes gelation. In an embodiment, the viscosity of the polymer system is about 1-15 cp before gelation. In an embodiment, gelation occurs at a temperature between about 40-80 degrees Celsius. In an embodiment, gelation can be delayed from about 1 day to 3 weeks by varying the polymer concentration from about 1000 parts per million to about 5000 parts per million and varying the PEI concentration from about 500 parts per million to about 2000 parts per million.

An embodiment of the disclosure is a method of improving sweep efficiency for an oil-bearing zone comprising preparing a polymer system comprising: a polymer consisting essentially of: acrylamide; 2-acrylamido-2-methylpropane sulfonic acid (AMPS); polyethylene glycol diacrylate; and a crosslinker comprising polyethyleneimine; wherein the polymer is in inverse emulsion form; and injecting the polymer system into a wellbore to improve the sweep efficiency. In an embodiment, the polymer is at a concentration of about 25-35%. In an embodiment, the polymer comprises about 50-95% acrylamide; about 5-50% AMPS; about 100-2000 parts per million polyethylene glycol diacrylate; and wherein the crosslinker comprises about 500-2000 parts per million polyethyleneimine crosslinker. In an embodiment, the polymer comprises about 80% acrylamide; about 20% AMPS; about 600 parts per million polyethylene glycol diacrylate. In an embodiment, the polyethyleneimine has a molecular weight of about 5,000-100,000 Daltons. In an embodiment, the polyethyleneimine has a molecular weight of about 60,000 Daltons. In an embodiment, the polymer system undergoes gelation. In an embodiment, the viscosity of the polymer system is about 1-15 cp before gelation. In an embodiment, gelation occurs at a temperature between about 40-80 degrees Celsius. In an embodiment, gelation can be delayed from 1 day to 3 weeks by varying the polymer concentration from about 1000 parts per million to about 5000 parts per million and varying the PEI concentration from about 500 parts per million to about 2000 parts per million.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
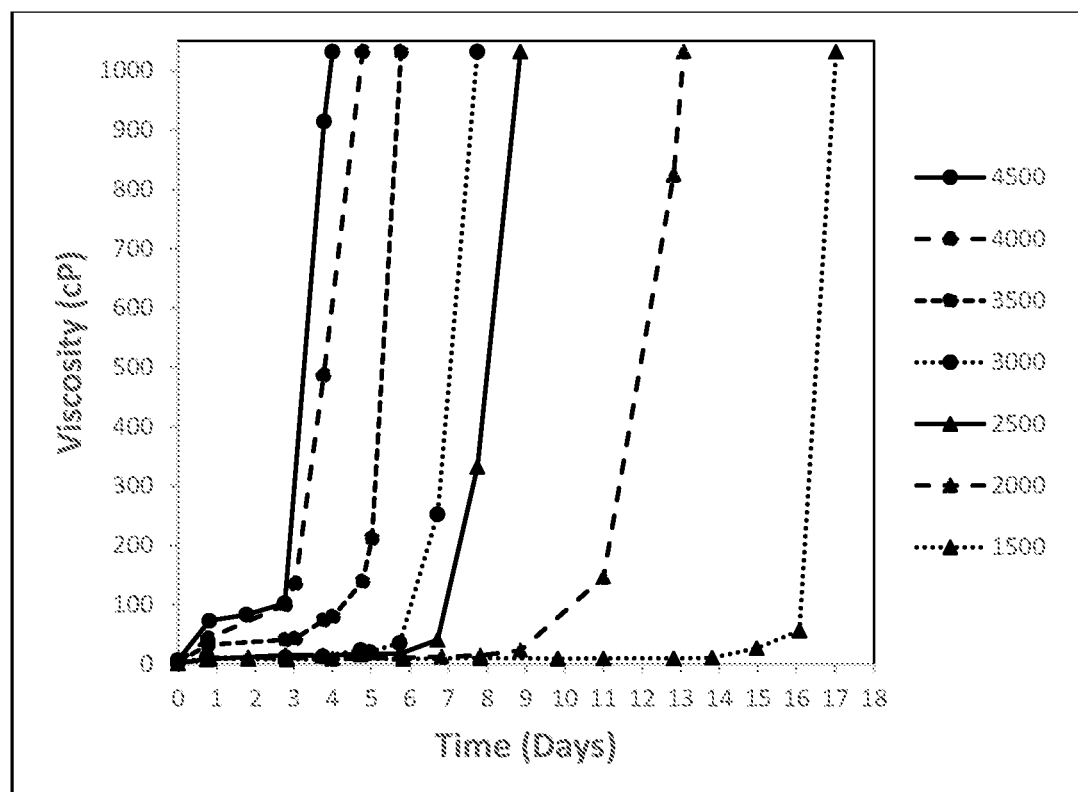
FIG. 1 depicts a graph of viscosity versus time at different concentrations (ppm) of ML-15.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

In an embodiment, the delayed polymer gelation system contains two components, the cross-linkable polymer and the polyethyleneimine (PEI) crosslinker. By varying the concentrations of the polymer and/or the concentration of the PEI crosslinker, the delay of gelation can be well controlled. Previous systems have required use of a third component, a delayed gelling agent, to achieve a similar delay effect.

In an embodiment, the delayed polymer gelation system has a low initial viscosity of 1-15 cp before gelation. This low viscosity helps the delayed gelation system to penetrate deep into the formation and achieve better selectivity to a high permeability zone over a low permeability oil-bearing zone. The delayed gelation is useful in placing the polymer and the crosslinker deep into the target high permeability zone and to form stable gels in situ to improve the sweep efficiency for the oil-bearing low permeability zone.

In an embodiment, the polymer gelation system includes 1) a polymer of acrylamide, AMPS, and 100-2000 ppm polyethylene glycol diacrylate in inverse emulsion form and 2) a polyethyleneimine (PEI) with a molecular weight of about 5,000-100,000 Daltons as the crosslinking agent. In an embodiment, the polymer contains about 50-95% acrylamide monomer, about 5-50% AMPS monomer, and about 100-2000 ppm polyethylene glycol diacrylate. In an embodiment, the polyethylene glycol diacrylate has a molecular weight of about 150-500 g/mol. The polymers are in inverse emulsion form with a polymer concentration of about 25-35%.

In an embodiment, the delayed polymer gelation system is used as a polymer gel to plug the high permeability subterranean zone in a hydrocarbon-bearing formation to improve the sweep efficiency of the injected fluids for enhancing recovery.

In an embodiment, at a temperature of about 40-80° C., the gelation of the polymer system was delayed from about 1 day to 3 weeks by controlling the concentration of the polymer from about 1000 ppm to 5000 ppm and the PEI crosslinker from about 500-2000 ppm.

EXAMPLES

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

Example 1. Synthesis of the Crosslinkable Polymer, ML15-12

ML15-12 was synthesized by inverse emulsion polymerization, which refers to hydrophilic monomers, frequently in aqueous solution, emulsified in a continuous oil phase using water-in-oil emulsifying surfactants and polymerized in the presence of water-soluble or oil-soluble initiators.

Example 2. Delayed Gelation at Different Polymer Concentrations

Different concentrations (ppm) of ML15-12, a polymer containing 80% acrylamide, 20% AMPS, and 600 ppm polyethylene glycol diacrylate-250 in inversion emulsion form with 30% active polymer are added to a deoxygenated synthetic brine of 5000 ppm salinity, together with 1400 ppm polyethyleneimine of 60,000 Dalton molecular weight. The resulting brine solution was placed into an oxygen-free glove box and incubated at 48-50° C. for various lengths of time before measuring the viscosity of the solution. FIG. 1.

Example 3. Delayed Gelation at Different Crosslinker Concentrations

Figure 2:
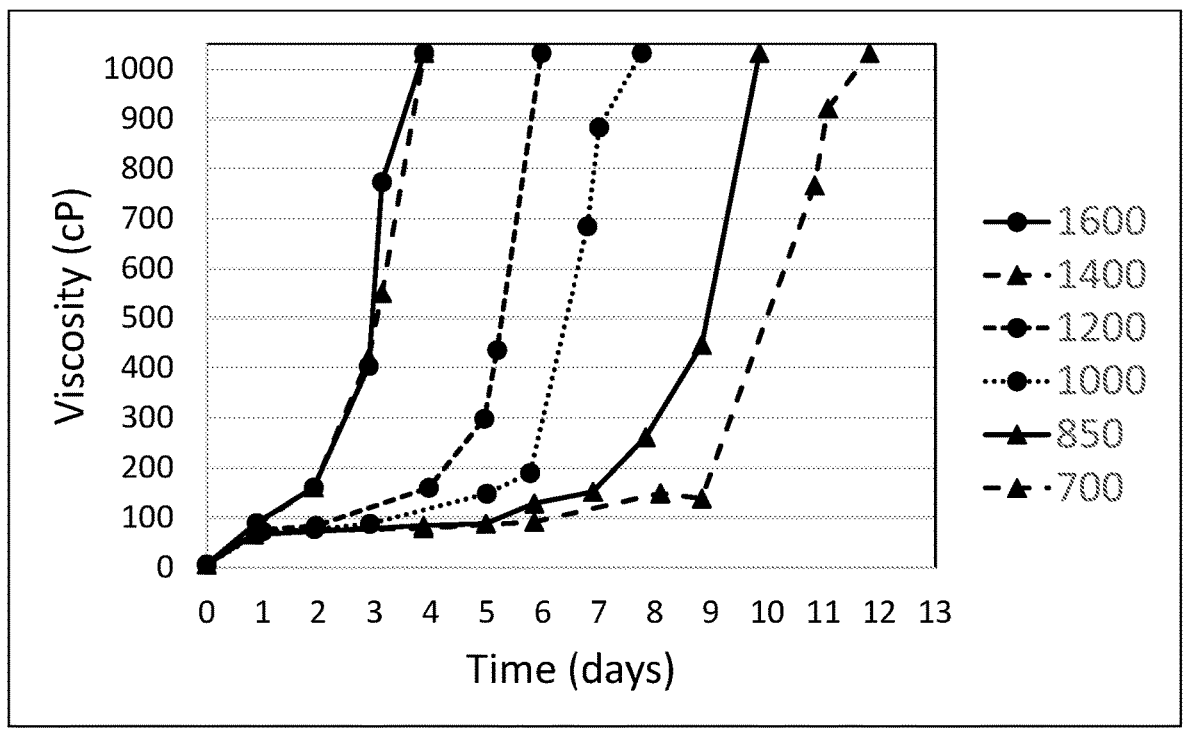
FIG. 2 depicts a graph of viscosity versus time at different concentrations (ppm) of polyethyleneimine.

Different concentrations (ppm) of polyethyleneimine of 60,000 Dalton molecular weight and 4,500 ppm of a polymer containing 80% acrylamide, 20% AMPS and 600 ppm polyethylene glycol diacrylate-250 in inversion emulsion form with 30% active polymer are added to a deoxygenated synthetic brine of 5000 ppm salinity. The resulting brine solution was placed into an oxygen-free glove box and incubated at 48-50° C. for various lengths of time before measuring the viscosity of the solution. FIG. 2.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

REFERENCES

1. U.S. Pat. No. 9,464,504.
2. U.S. Pat. No. 9,796,902.

What is claimed is:
1. A polymer system consisting essentially of:
   a polymer, the polymer comprising:
   acrylamide;
   2-acrylamido-2-methylpropane sulfonic acid (AMPS);
   and polyethylene glycol diacrylate;
   and a crosslinker comprising polyethyleneimine,
   wherein the polymer is in inverse emulsion form and generates gels at temperatures between about 40 to 80 degrees Celsius.
2. The polymer system of claim 1, wherein the polymer is at a concentration of 25-35 mol %.
3. The polymer system of claim 1, wherein the polymer comprises:
   50-95 mol % acrylamide;
   5-50 mol % AMPS;
   100-2000 parts per million polyethylene glycol diacrylate; and
   wherein the crosslinker comprises 500-2000 parts per million polyethyleneimine.

4. The polymer system of claim 3, wherein the polymer further comprises:
80 mol% acrylamide;
20 mol% AMPS; and
600 parts per million polyethylene glycol diacrylate.

5. The polymer system of claim 1, wherein the polyethyleneimine has a molecular weight of 5,000-100,000 Daltons.

6. The polymer system of claim 5, wherein the polyethyleneimine has a molecular weight of 60,000 Daltons.

7. The polymer system of claim 1, wherein the polymer system undergoes gelation.

8. The polymer system of claim 7, wherein the viscosity of the polymer system is 1-15 cp before undergoing gelation.

9. The polymer system of claim 7, wherein the gelation is capable of being delayed from 1 day to 3 weeks by varying the concentration of polymer that includes acrylamide, 2-acrylamido-2-methylpropane sulfonic acid (AMPS), polyethylene glycol diacrylate from 1000 parts per million to 5000 parts per million and varying the polyethyleneimine concentration from 500 parts per million to 2000 parts per million.

10. A method of improving sweep efficiency for an oil-bearing zone, the method comprising:
preparing a polymer system comprising:
a polymer consisting essentially of:
acrylamide;
2-acrylamido-2-methylpropane sulfonic acid (AMPS); and
polyethylene glycol diacrylate; and
a crosslinker comprising polyethyleneimine,
wherein the polymer is in inverse emulsion form and generates gels at temperatures between about 40 to 80 degrees Celsius;
and injecting the polymer system into a wellbore to improve the sweep efficiency.

11. The method of claim 10, wherein the polymer is at a concentration of 25-35 mol % in the inverse emulsion.

12. The method of claim 11, wherein the polymer comprises:
80 mol % acrylamide;
20 mol % AMPS;
600 parts per million polyethylene glycol diacrylate.

13. The method of claim 10, wherein the polymer comprises:
50-95 mol % acrylamide;
5-50 mol % AMPS;
100-2000 parts per million polyethylene glycol diacrylate; and
wherein the crosslinker comprises 500-2000 parts per million polyethyleneimine crosslinker.

14. The method of claim 10, wherein the polyethyleneimine has a molecular weight of 5,000-100,000 Daltons.

15. The method of claim 14, wherein the polyethyleneimine has a molecular weight of 60,000 Daltons.

16. The method of claim 10, wherein the polymer system undergoes gelation.

17. The method of claim 16, wherein the viscosity of the polymer system is 1-15 cp before gelation.

18. The method of claim 16, wherein gelation can be delayed from 1 day to 3 weeks by varying the polymer concentration from 1000 parts per million to 5000 parts per million and varying the polyethyleneimine concentration from 500 parts per million to 2000 parts per million.

* * * * *